United States Patent
Batycky et al.

(10) Patent No.: US 6,519,531 B1
(45) Date of Patent: Feb. 11, 2003

(54) SYSTEM AND METHODS FOR VISUAL INTERPRETATION OF WELL RATE ALLOCATION FACTORS

(76) Inventors: Rod P. Batycky, 1931 Westmount Rd. N.W., Calgary, AB (CA), T2N 3M8; Marco R. Thiele, 2430 Lake St. #4, San Francisco, CA (US) 94121

( * ) Notice: Subject to any disclaimer, the term of this patent is extended or adjusted under 35 U.S.C. 154(b) by 0 days.

(21) Appl. No.: 09/671,935

(22) Filed: Sep. 27, 2000

(51) Int. Cl.$^7$ ................................................ G01V 9/00
(52) U.S. Cl. .......................................... 702/12; 702/13
(58) Field of Search ........................... 702/5, 6, 11, 12, 702/13, 14, 16; 367/21, 25, 38, 68, 69, 70, 73; 345/441

(56) References Cited

U.S. PATENT DOCUMENTS

| | | |
|---|---|---|
| 5,459,820 A | 10/1995 | Schroeder et al. |
| 6,128,579 A * | 10/2000 | McCormack et al. ......... 702/13 |
| 6,446,721 B2 * | 9/2002 | Patel et al. ............... 166/252.1 |

OTHER PUBLICATIONS

Koenig, Randall R., "Rate–Weighted Allocation—A New Method in Determining Waterflood Pattern Allocation Factors," Dec. 17, 1991, Amoco Production Co., Houston, Texas.

* cited by examiner

*Primary Examiner*—Edward Lefkowitz
*Assistant Examiner*—Anthony Gutierrez
(74) *Attorney, Agent, or Firm*—Sedwick, Detert, Moran & Arnold; James Yuanxin Li

(57) ABSTRACT

System and methods for creating a visual interpretation of the amount of flow between injection and production wells in a hydrocarbon field at any instant in time. Using conventional reservoir simulation input, streamlines are first generated using a streamline-based flow simulator. The streamlines are then used to determine well pairs and the volumetric flow rate associated with each well in the pair. The fraction of the flow rates in the well pair to the total flow rates of each well are then calculated. These fractions are also known as well allocation factors. After placing the well locations on a multi-dimensional map, the well allocation factors are represented by a multi-dimensional, multi-color stick map connecting each well pair.

12 Claims, 5 Drawing Sheets

SYSTEM AND METHODS FOR VISUAL INTERPRETATION OF WELL RATE ALLOCATION FACTORS

BACKGROUND OF THE INVENTION

Contrary to common belief, hydrocarbons do not occur in gigantic underground caves but are trapped in the tiny pore space of sedimentary rock. After an initial production period (primary production) when the reservoir is produced under its own pressure, additional oil can only be recovered by replacing the in situ volume of oil and gas with something else, such as water or solvent. The use of such secondary recovery techniques on oil fields can significantly increase the extraction of oil and gas. In waterfloods, for example, brine is pumped into the reservoir through injection wells and the displaced oil and gas is recovered at production wells. In tertiary recovery techniques, such as thermal recovery, gas injection, and chemical flooding the goal is to modify physical properties of the resident hydrocarbons, such as densities, viscosities, and interfacial tensions to recover hydrocarbons left behind by waterflooding.

It is has been well established that early implementation of secondary and tertiary recovery mechanisms can significantly increase the ultimate recovery of hydrocarbons versus a later implementation of such methods. These technologies have thereby led to significant energy reserve additions, improved recovery of a finite precious resource, and major environmental benefits by reducing the number of new wells required.

Improved recovery methods also require improved field management needs. As an example, the Alberta Energy Resources Conservation Board (ERCB) requires oil companies to balance their production patterns in order to maximize recovery from existing well patterns. Balancing patterns essentially means that for every barrel of water injected a barrel of fluid is recovered from the production wells surrounding the injector. A similar requirement is imposed by the Texas Railroad Commission.

The present invention relates to a method for the visual representation of the amount of flow between injection and production wells, i.e., the well rate allocation factor (WAF), for each well in an oil field. The invention displays the percentage of support each injector well is giving to each producer well or the percentage of support each production well receives from each injection well. The invention, for example, will help companies engineer balanced patterns, or to determine visually and quickly the effectiveness of injection techniques thereby helping to avoid devoting economic resources to those wells or patterns from which there is ineffective production. By visualizing the interaction between well pairs, the present invention allows engineers to design more efficient recovery schemes and thereby increase the ultimate recovery from current hydrocarbon reservoirs.

The system for implementing the present invention requires the use of a computing device with a display capable of depicting graphic data.

CURRENT TECHNOLOGY

An example of current technology in determining and visualizing well allocation factors is discussed in Amoco Production Company document entitled "Rate-Weighted Allocation—A New Method in Determining Waterflood Pattern Allocation Factors" by R. Koenig. This method centers on the assumption that patterns are predefined and all injection does not go beyond the immediate producers in the predefined pattern. In the five spot example used in the Amoco memo then, this would mean that all the water injected by well 55 is strictly allocated to the four surrounding producers 676, 588, 677, and 566.

A second example is the method of U.S. Pat. No. 6,128,579 issued to McCormack et al., which uses a genetic algorithm to compute the allocation factors between well pairs in injection patterns of a field. Like the Amoco approach, this method centers on the assumption that the patterns have been predefined. McCormack et al. predefine a pattern using a volume centered on the production well (col. 27, row 39) prior to applying the genetic algorithm to determine the proportional allocation of fluids.

There are three important drawbacks to the approaches used in the Amoco memo and McCormack et al., which comprised the then existing technology: 1) Real reservoirs are complex, three-dimensional objects which will lead to injected fluids going well beyond the immediate producers, reducing possible support to wells in the immediate pattern and at the same time supporting wells outside of the immediate pattern. 2) Many reservoirs are not developed in strict patterns, making an approach based on predefined patterns difficult, if not impossible to implement. 3) The visual representation of the allocation factors is a simple picture that assumes the flow from injectors is to the immediately surrounding producers.

The present invention, on the other hand, relies on determining which producers are supported by which injectors (well pairs) through a streamline-based flow simulation, thereby allowing a more accurate and realistic determination of well pairs independently of their physical proximity. The well patterns and well pairs are output results from the streamline-based flow simulation rather than being predefined as in the Amoco approach and in McCormack et al. As such, the present invention represents a significant and tangible improvement over the prior art. The simulation accounts for well rates, the 3D reservoir structure/geology, fluid distributions, fluid properties, and well location, when determining the allocation factors.

DESCRIPTION OF THE PREFERRED EMBODIMENT

Figure 1:
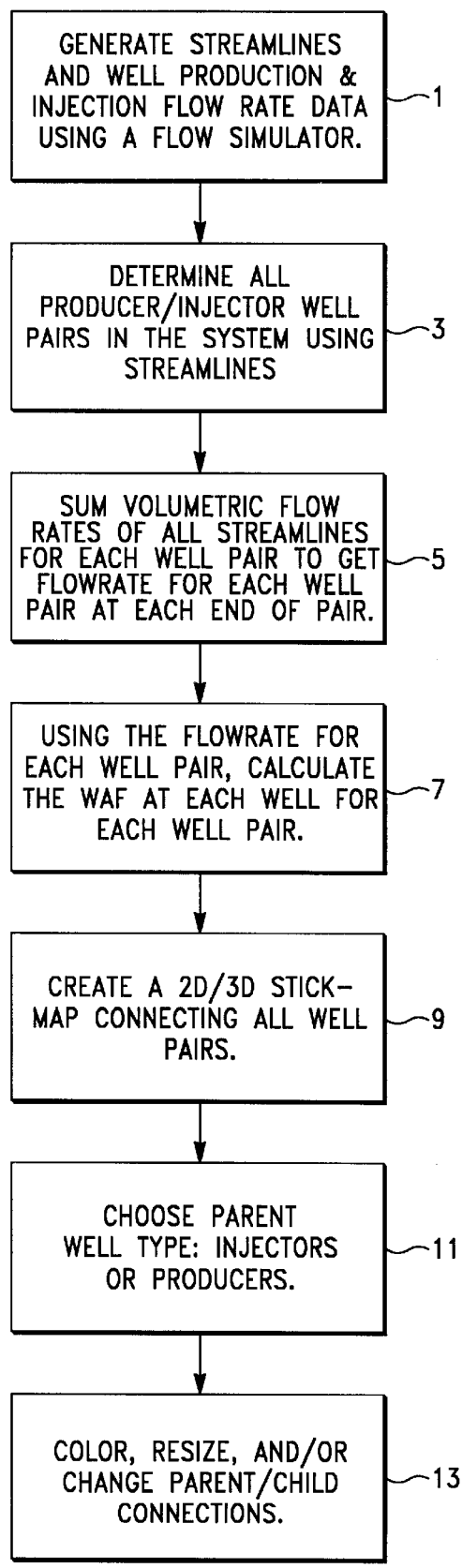
FIG. 1 is a schematic flowchart of the method of the present invention.

FIG. 1 is a schematic flowchart for the method of the present invention. The operation will hereinafter be described in detail with reference to FIG. 1.

Figure 2:
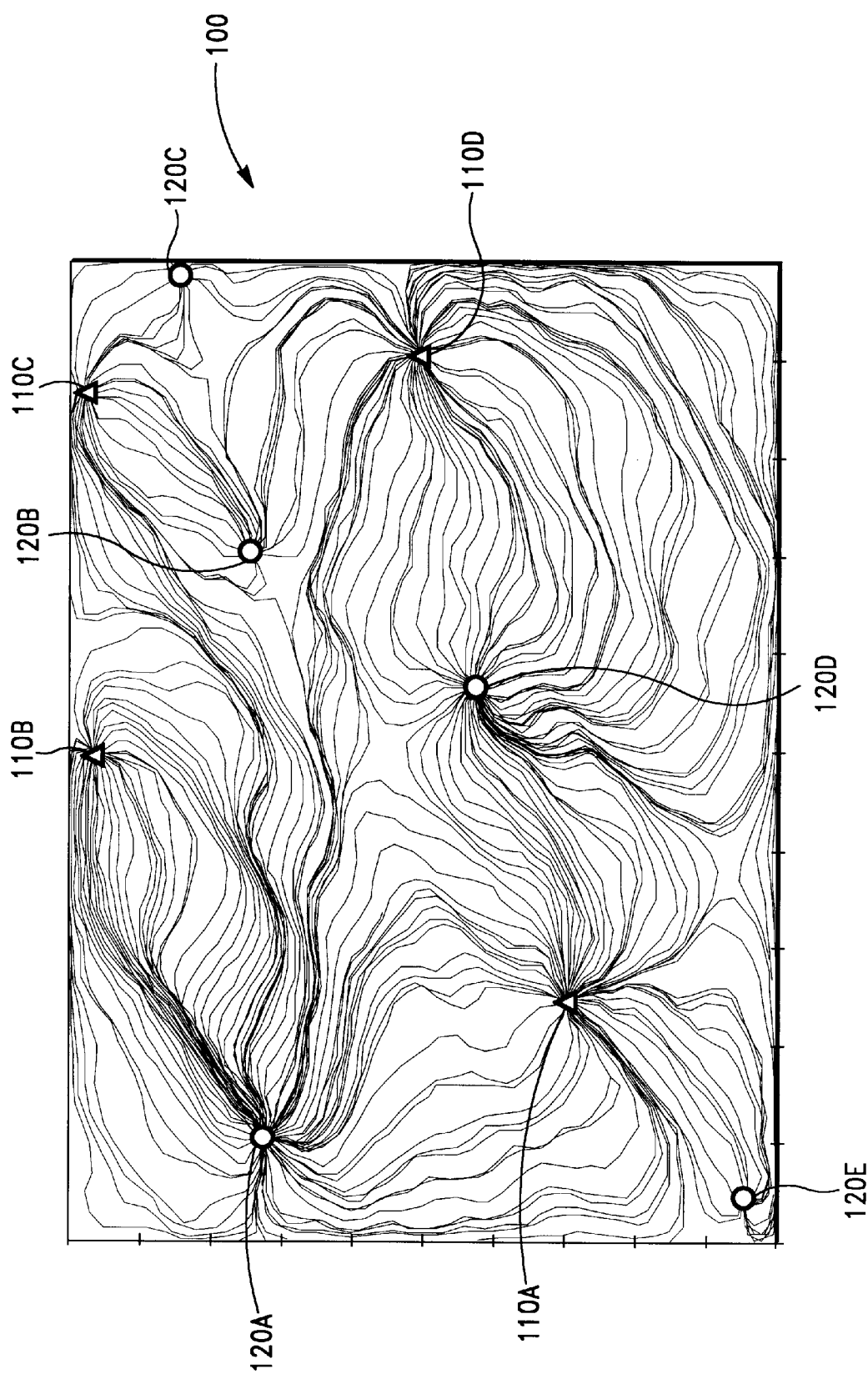
FIG. 2 shows an example of streamlines for a particular arrangement of injection and producer wells in a field.

First, all necessary data for a full fluid flow reservoir simulation, including well boundary conditions (well rates), pressure-volume-temperature fluid data, reservoir geology data, et cetera, are provided. Such data are then used to generate streamlines by means of a commercially available program such as StreamSim Technologies' 3DSL reservoir simulator, a streamline-based flow simulator not based on any genetic algorithm, as represented within activity block 1. An example of streamlines generated in this manner are shown in FIG. 2.

Figure 3:
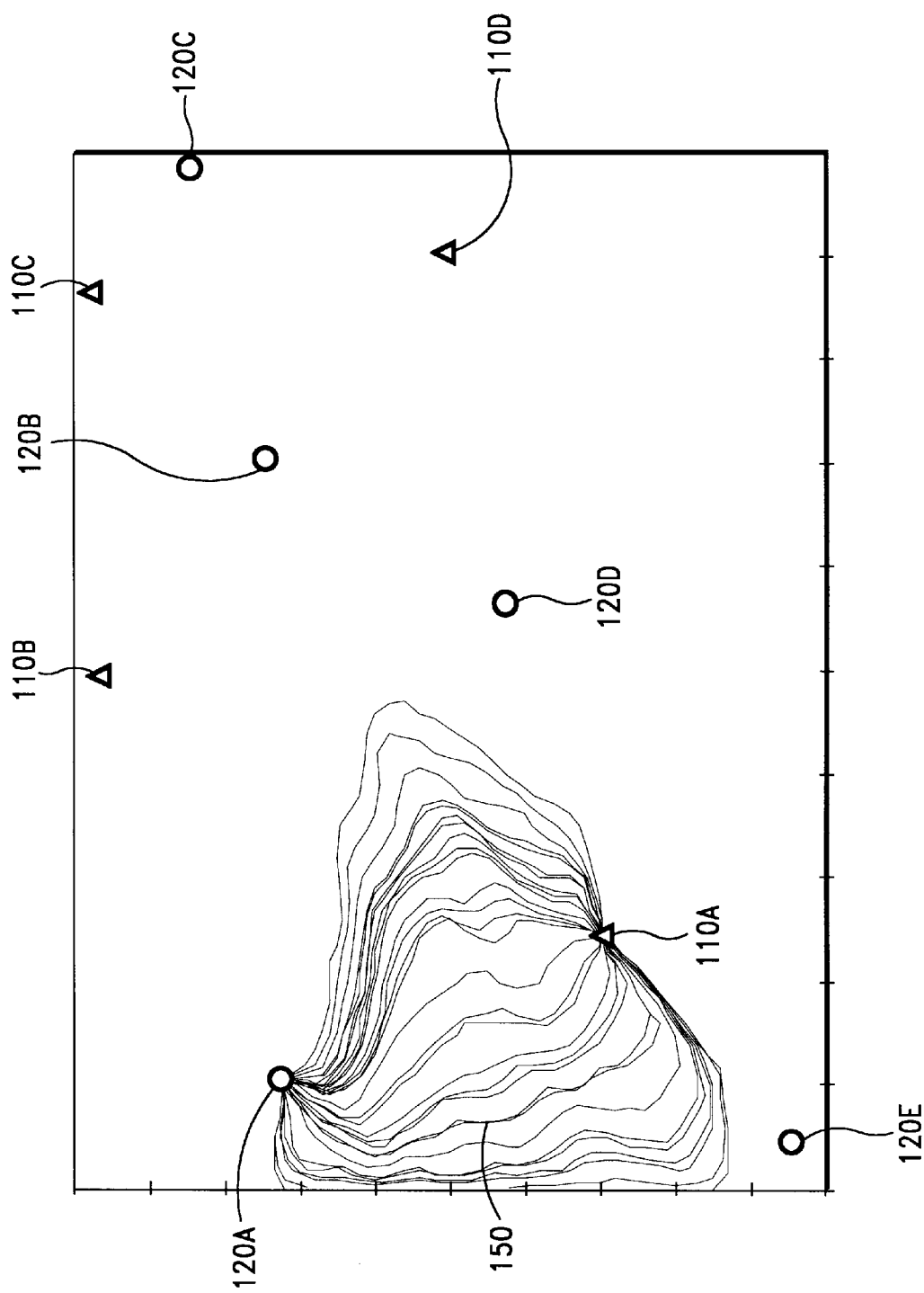
FIG. 3 shows an example of streamlines for a selected injector and producer well pair.

Next, the streamlines are used to determine the well pairs and the flow rates along streamlines are used to determine the well allocation factors (WAF), as represented within activity block 3. An example of an isolated well pair is shown in FIG. 3.

As represented within activity block 5, the volumetric flow for all of the streamlines for each well pair are then added together in order to get the flowrate for each well pair at the well ends of the pair. Thus, for all (N) injector (I)/producer (P) pairs DO k=1, N:

$Q_{k,I} = \Sigma$(rate of all streamlines at the injection end)

$Q_{k,P} = \Sigma$(rate of all streamlines at the production end)

where $Q_{k,I}$ and $Q_{k,P}$ are the flowrates of the $k^{th}$ well pair at the injection and production end respectively.

Next, as represented in activity block 7, the WAF for each well are calculated using the flowrate for each well in the well pair as follows:

$WAF_{k,P} = Q_{k,P}/Q^T_P$ $WAF_{k,I} = Q_{k,I}/Q^T_I$ $WAF_{k,P}$ and $WAF_{k,I}$ are the well allocation factors of the producer and injector wells in the well pair k, and $Q^T_P$ and $Q^T_I$ are the total flowrates of the producer and injector respectively.

Figure 4:
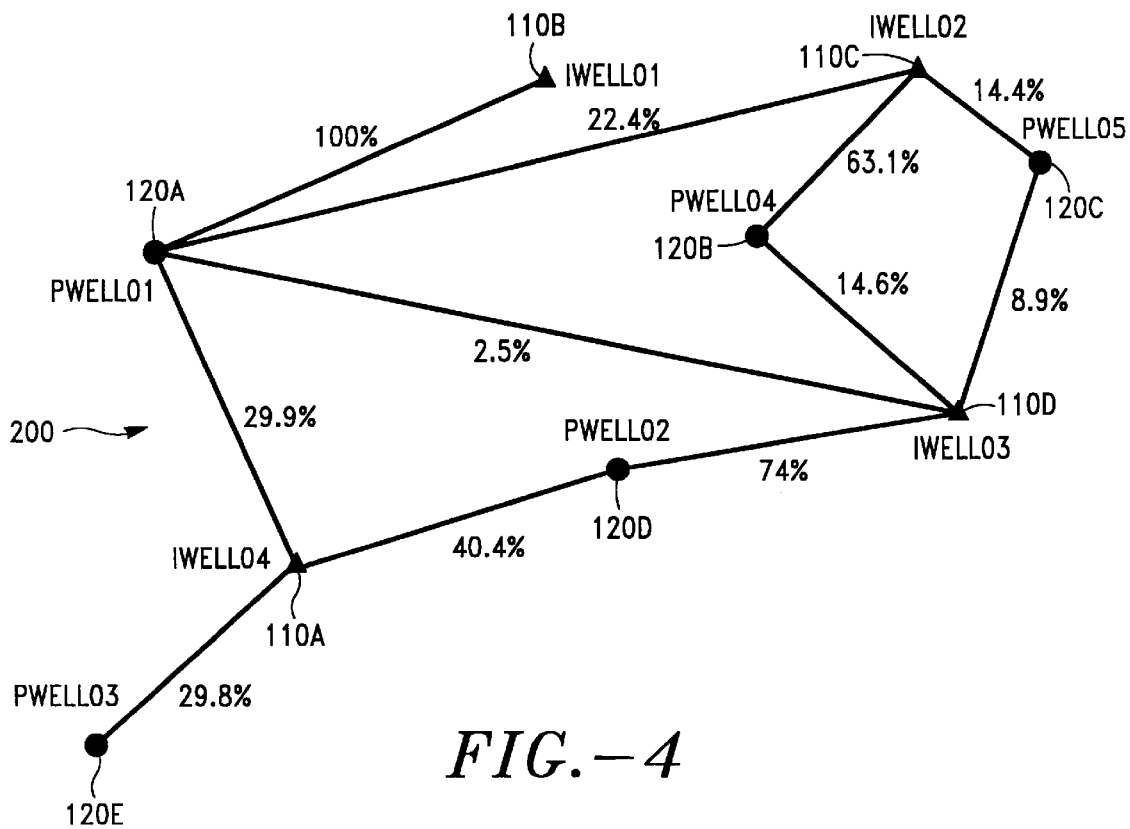
FIG. 4 shows an example of the well rate allocation factors depicted as a stick map in which the parent wells are injector wells.
Figure 5:
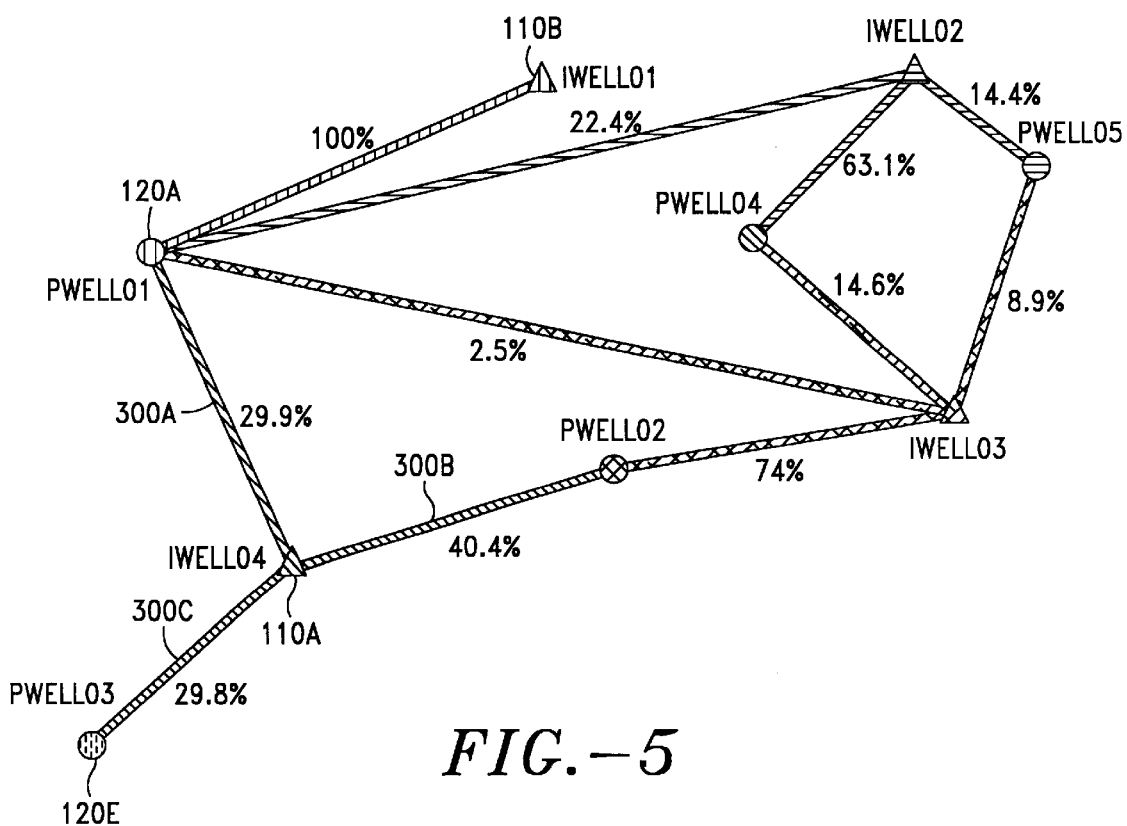
FIG. 5 shows an example, with the injector wells as the parent wells, of the well rate allocation factors depicted as a color-coded (or pattern-coded) stick map.

At the completion of the WAF calculations, the data are then represented by a two- or three- dimensional stick map connecting the well pairs, as represented within activity block 9. The WAF may be depicted on the stick map as an absolute number or as a percentage. All wells are located at their relative coordinate positions in the system, and identified by symbols and alphanumeric identifiers. Examples of such stick maps are shown in FIG. 4 and FIG. 5 wherein triangles are used to represent injectors and circles are used to represent producers.

Injector/producer well pairs that are connected directly via streamlines are reconnected with a straight line (i.e., a stick). Depending on the application, the user may select the parent well type to be either injectors or producers, as represented within activity block 11.

The sticks connecting each pair may be colored black or, for ease of visualization, may be altered by the user so that they have the same coloration (or pattern) as either the producer well or the injector well. The user may select a unique color (pattern) so as to visually isolate and depict a group of well pairs. The use of color is to show relationships between wells rather than a physical property and is therefore different from U.S. Pat. No. 5,459,820 issued to Schroeder et al. Schroeder et al. use color along streamtubes to represent local scalar point properties of a vector field.

The thickness of each stick (k) can be used to represent the following relative data: (1) the volumetric flow rate of each stick k ($Q_{k,(I \text{ or } P)}$) relative to the total flow rate of the parent well ($Q^T_{(I \text{ or } P)}$), (2) the WAF of each stick k relative to the maximum WAF of all WAF's in the field, and (3) the volumetric flow rate of each stick k ($Q_{k,(I \text{ or } P)}$) relative to the maximum flow rate of all parent wells in the field (MAX $Q^T_{(I \text{ or } P)}$)). This is represented within activity block 13. The use of the stick thickness to represent volumetric flow distinguishes itself from Schroeder et al. in that (a) the volumetric flow rate is not a local point property and (b) the thickness of the stick represents a summation of all the streamlines and their individual flow rates between a well pair. Schroeder et al. use polygons of varying radius to depict local point properties of the vector field along a single streamline.

In addition to varying the thickness of each stick depending on the relative data, the user may also set the minimum and maximum line thicknesses of the sticks. The invention will then adjust the stick map so that each line depicted is scaled to fall within this minimum and maximum.

Where the WAF of each stick (k) is relative to the total flow rate of the parent well, the following formula is used:

Thickness$_k$=Minimum thickness+$WAF_{k,(I \text{ or } P)}$ * Maximum thickness

Where the WAF of each stick is relative to the maximum WAF of all WAF's, the following formula is used:

Thickness$_k$=Minimum thickness+$WAF_{k,(I \text{ or } P)}$/ MAX (WAF of all parent wells) * Maximum thickness Where the WAF of each stick is relative to the maximum flow rate of all parent wells, the following formula is used:

Thickness$_k$=Minimum thickness+$Q_{k,P}$/MAX($Q^T_P$) of all producer parent wells) * Maximum thickness, or Thickness$_k$=Minimum thickness+$Q_{k,I}$/MAX($Q^T_I$) of all injector parent wells) * Maximum thickness This type of visual diagram can be used in any subsurface flow system containing wells, such as in ground water remediation sites and gas fields. More generally, the diagram could also be used to show the relationship between any two objects, using line characteristics, such as stroke type, thickness, and color to underline the physical characteristics of the system. For examples, such a diagram could be used to illustrate the air/road traffic flow between cities, the flow of electricity between power stations, or the flow of goods between continents.

FIG. 2 depicts an example of streamlines 100 generated by a commercial program such as the StreamSim Technologies' 3DSL reservoir simulator. The streamlines depict fluid flow simulation between injection wells and production wells. In this example, the injector wells are represented by triangles 110A, 110B, 110C, and 110D. The producer wells are represented by circles 120A, 120B, 120C, 120D, and 120E.

FIG. 3 depicts the isolated streamlines 150 between injector well 110A and producer well 120A from FIG. 2.

FIG. 4 depicts the two-dimensional black and white stick map 200 created by the invention from the simulated streamlines of FIG. 1. In this example, the simulation shows that the flow from injector well 110A travels to producer wells 120A, 120D, and 120E at a proportion of 29.9%, 40.4%, and 29.8%, respectively. (The percentages may not add up to 100% due to rounding.) Optionally, the stick map may be depicted in three dimensions.

FIG. 5 depicts the same two-dimensional stick map as shown in FIG. 4. However, for ease of visualization, the flow from injector well 110A is represented by sticks having the same color or pattern. Thus, the user can determine visually that sticks 300A, 300B, and 300C all represent flow from the same well, in this example, injector well 110A. Optionally, the triangle representing well 110A may be black, the same color as the sticks connected to its well pairs, or another user selected color.

Figure 6:
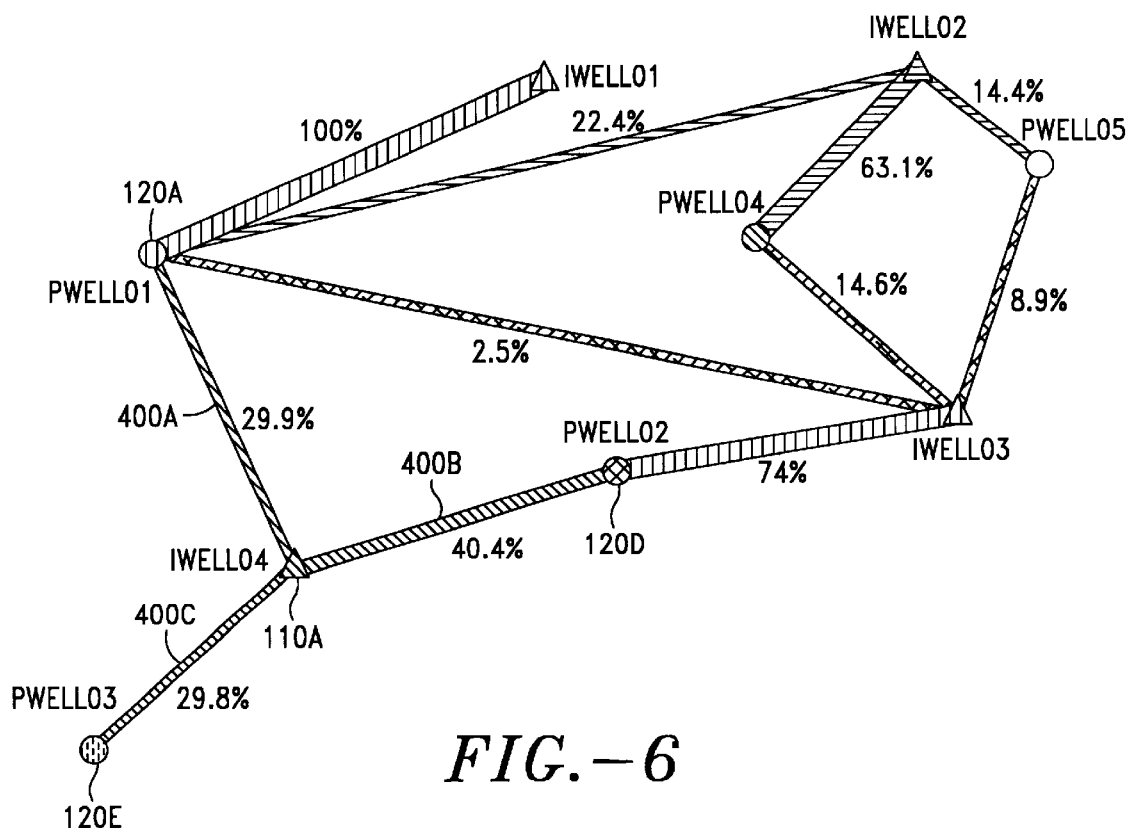
FIG. 6 shows an example, with the injector wells as the parent wells, of the well rate allocation factors depicted as a variable-width color-coded (or pattern-coded) stick map.

FIG. 6 depicts the same two-dimensional stick map as shown in FIG. 5. However, for ease of visualization, the width of each stick varies in proportion to the percentage of the flow. Thus, stick 400B (which represents 40.4% of the flow) is shown as being approximately 10% wider than stick 400A (which represents 29.9% of the flow).

Figure 7:
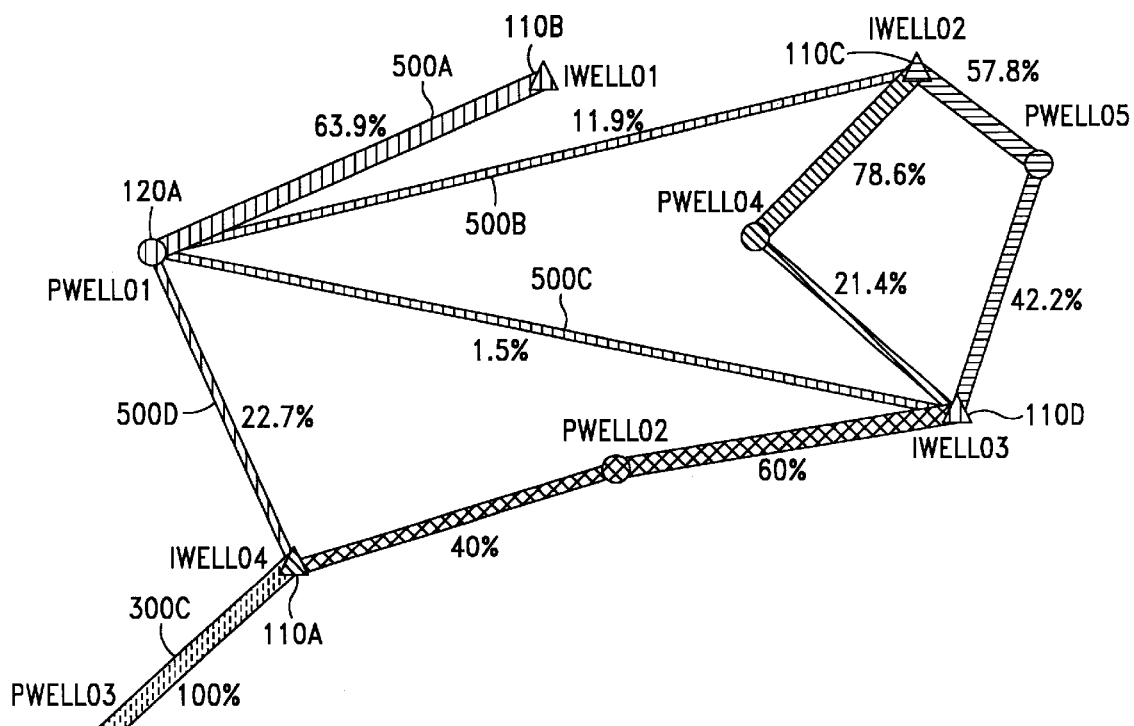
FIG. 7 shows an example, with the producer wells as the parent wells, of the well rate allocation factors depicted as a variable width color-coded stick map.

FIG. 7 depicts the same well field as shown in FIG. 2 but with the user selecting producer wells as the parent wells. In this example, producer well 120A is paired with injector wells 110A, 110B, 110C, and 110D, which comprise 22.7%, 63.9%, 11.9%, and 1.5%, respectively, of the flow.

Accordingly, the invention allows for intuitive visualization of the interaction between well pairs, thus allowing engineers to design more efficient recovery schemes and thereby increase the ultimate recovery from current hydrocarbon reservoirs.

Although the description above contains many specifications, these should not be construed as limiting the scope of the invention but as merely providing illustrations of some of the presently preferred embodiments of this invention. Thus, the scope of the invention should be determined by the appended claims and their legal equivalents, rather than by the examples above.

What is claimed is:

1. System for calculating and displaying well rate allocation factors, the system comprising
   a. a digital computer having a computer display;
   b. means for collecting well production and flow rate data for each well;
   c. means for transforming the collected data into streamlines;
   d. means for calculating and establishing well pairs from streamlines and positioning well production and injection interval locations on a multi-dimensional map;
   e. non-genetic algorithm means for calculating the volumetric flow rate of each well pair in order to determine the well rate allocation factor at each well for each well pair; and
   f. means for plotting the well rate allocation factors as a multi-dimensional stick map connecting well pairs.

2. System according to claim 1 wherein the multi-dimensional stick map depicts all paired wells by use of the same color or pattern.

3. System according to claim 1 wherein the multi-dimensional stick map depicts each stick with a width varying in proportion to the total flow rate of a parent well.

4. System according to claim 1 wherein the multi-dimensional stick map depicts each stick with a width varying in proportion to the maximum well rate allocation factor.

5. System according to claim 1 wherein the multi-dimensional stick map depicts each stick with a width varying in proportion to the maximum flow rate of all parent wells.

6. System according to claim 1 wherein the multi-dimensional stick map depicts each stick with a width varying in proportion to a user selected maximum width.

7. A method for calculating and displaying well rate allocation factors, the method comprising the steps of:
   a. collecting well production and flow rate data for each well;
   b. transforming the collected data into streamlines;
   c. calculating and establishing well pairs from streamlines and positioning well production and injection interval locations on a multi-dimensional map;
   d. calculating with a non-genetic algorithm simulator the volumetric flow rate of each well pair in order to determine the well rate allocation factor at each well for each well pair; and
   e. plotting the well rate allocation factors as a multi-dimensional stick map connecting the well pairs.

8. A method according to claim 7 wherein the multi-dimensional stick map depicts all paired wells by use of the same color or pattern.

9. A method according to claim 7 wherein the multi-dimensional stick map depicts each stick with a width varying in proportion to the total flow rate of a parent well.

10. A method according to claim 7 wherein the multi-dimensional stick map depicts each stick with a width varying in proportion to the maximum well rate allocation factor.

11. A method according to claim 7 wherein the multi-dimensional stick map depicts each stick with a width varying in proportion to the maximum flow rate of all parent wells.

12. A method according to claim 7 wherein the multi-dimensional stick map depicts each stick with a width varying in proportion to a user selected maximum width.

* * * * *